Oct. 30, 1951          J. P. CONLAN          2,573,408
COMBINED FLUID PRESSURE AND MANUALLY OPERATED VALVE
Filed Oct. 12, 1945
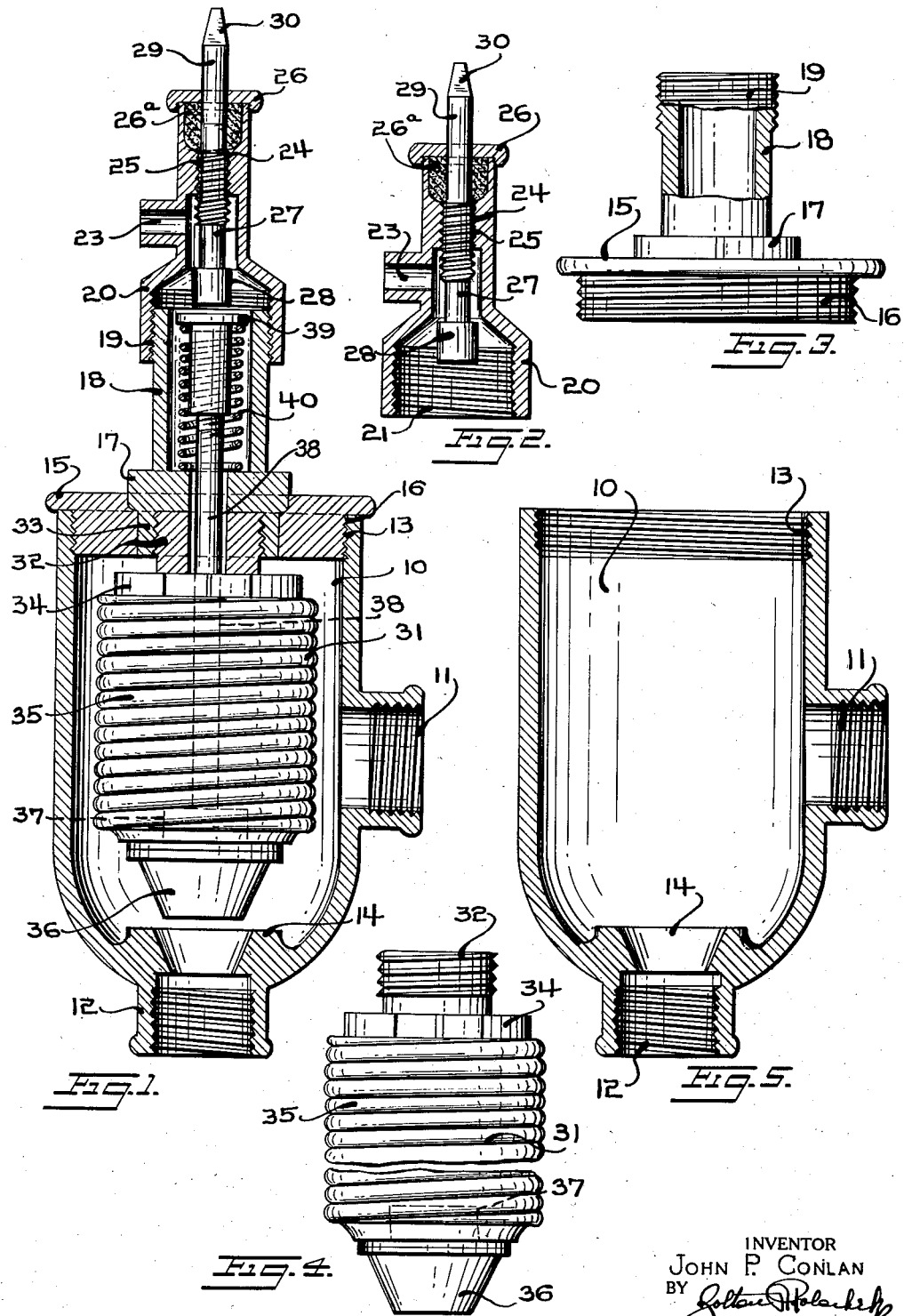
INVENTOR
JOHN P. CONLAN Patented Oct. 30, 1951

2,573,408

UNITED STATES PATENT OFFICE 2,573,408

COMBINED FLUID-PRESSURE AND MANUALLY OPERATED VALVE

John P. Conlan, New York, N. Y.

Application October 12, 1945, Serial No. 621,933

4 Claims. (Cl. 137—153)

1

This invention relates to new and useful improvements in a combined manual and fluid pressure controlled valve.

More specifically, the present invention proposes the construction of a valve for controlling the flow of steam or other fluid, an air pressure and an emergency manual control, the air pressure control being of the bellows type.

This valve will automatically control temperature of a room when worked in conjunction with a thermostat. For instance, when the thermostat is set at 72 degrees Fahrenheit, the thermostat automatically passes air to the valve, which closes the valve seat shutting off the source of fluid supply, for instance, the supply of steam to a radiator. In any event, it shuts off the flow of whatever fluid is being used in the particular apparatus involved. The valve will remain closed at 8 pounds air pressure, and will not release until the thermostat has gone down 1 or 1½ degrees, which slowly releases air pressure on the valve, which, in turn, releases steam pressure. This range can be set higher or lower, according to whatever temperature is desired. The minimum is four pounds air pressure, and the maximum is fifteen pounds on this type of valve. This can be set higher or lower, by slight changes in the spring tension of the valve. One degree of temperature change is comparable to two and one half pounds of air pressure change.

On the neck of the valve, which has a compression fitting for air line, is installed a small hand controlled rod. This can be used in case of an emergency, and is made in one piece with the valve cap. In cases where this is not required, the cap and connection to air lines can be installed if desired.

This arrangement may be used in connection with all types of temperature control valves including high pressure valves, also can be made in the form of normally closed type of valves.

When the steam valve is in operation under thermostat control the small hand controlled rod is in an inoperative position leaving a space for air operation only. The steam valve does not require any packing glands as it is one solid piece in the bonnet, therefore it cannot leak any steam. This differs greatly from other steam valves which have to be packed every two years, plus the danger of leaking steam striking someone.

Many thermostatically controlled valves, when the bellows, seat or disc breaks, leaves the room in an overheated condition and cannot be relieved until repairs can be made on the valve.

2

The control valve of the present invention can also be operated as a hand controlled valve, as previously explained. The valve can be disassembled and reassembled in five minutes. This cuts loss of time down to a minimum. It can be applied to refrigeration as well as to steam.

In 75% of buildings where thermostat control is now in existence, radiators or coils have two valves; one temperature control valve on the steam side and one element-control trap on the return line. I find from experience that where room temperature is down to 60 degrees, the thermostat valve has opened for heat. While condensation is in the radiator and is above a temperature of 90 degrees, the element-control trap remains closed and will not pass condensation, therefore it will not let steam into the radiator. Immediately condensation has discharged from the line, and steam follows, the element-control trap immediately closes as dry steam hits it. It will not open again until steam in the radiator has condensed and become cold enough to allow contraction of the element. This may take a period of ten minutes and regardless of the temperature of the room or position of the steam valve.

There are instances of the room taking two hours to heat up from 60 degrees to 70 degrees, which is too long a period. The valve of the present invention can be installed on either side of the radiator, steam or return, but it has been found that installation on the return side of the radiator gives a better result.

The element trap can be eliminated, hand control on lines can be eliminated, as the valve of the present invention has its own hand control. Whatever steam passes by this valve can be taken care of by one large element trap, installed near the boiler. This will entail great savings in control and repair and give more efficent control of temperature.

In cases where the temperature control valve is not working and rooms become overheated, there is no way to control the steam unless the line has a separate hand control valve. This is not always installed with temperature valves. Windows have to be opened to cool off the room which causes loss of steam and fuel consumption, and is very expensive to maintain. The difference in the valve of the present invention is it can be immediately converted into a hand controlled valve, and can be regulated to any desired temperature. The small adapter can be installed in one minute and comes with a wheel or key, whichever is preferred. The bellows used in this valve is made from stainless steel and has a long life, and a high resistance to heat or chemical action. It will withstand an internal pressure of 250 pounds per square inch.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a vertical axial section through the valve of the present invention, parts being shown in full.

Fig. 2 is a vertical axial section through the hand controlled part of the valve, parts being shown in full.

Fig. 3 is a side elevational view of the barrel cap, with a portion thereof being shown in section.

Fig. 4 is an enlarged foreshortened elevational view of the bellows valve element.

Fig. 5 is an axial section through the barrel.

The valve according to the present invention, includes a barrel 10 having a steam inlet nozzle 11 internally threaded, and projecting laterally from the side of the barrel, and a downwardly opening steam outlet nozzle 12, internally threaded. The top of the barrel has internal threads 13. A valve seat 14 is provided on the inner wall of the barrel adjacent the nozzle 12. The barrel is best shown in Fig. 5.

The barrel is closed at its top by a cap 15, see Fig. 3, having external threads 16 at its bottom margin for coaction with the threads 13. A fitting 17 is secured in an orifice in the middle of the cap 15. A tubular neck 18 extends upwardly from the fitting 17 and is integral therewith, this neck having external threads 19 at its upper end.

A casing 20, best shown in Fig. 2, is screwed on top of the neck 18, the casing 20 having internal threads 21 at its bottom coacting with threads 19. The casing 20 has a lateral air inlet nozzle 23, an axial bore 24 opening into the tubular neck 18, intersecting the nozzle 23 and having internal threads 25 above the nozzle 23. The top of the casing is closed by a cap 26 having an orifice in line with the bore. A rod 27 is disposed in the casing 20. The rod 27 has threads engaging the threads 25, a head 28 at the bottom thereof and an end portion 29 extending upwardly beyond the top of the casing. The end portion 29 is squared, providing a fitting 30 for receiving a handle or key (not shown), by which the rod 27 can be turned for causing it to move up and down.

A bellows type valve 31, best shown in Fig. 4, is disposed in the barrel. It has a threaded nipple 32 at its top screwed into a boss 33 on the fitting 17, a hexagonal wrench fitting 34 below the nipple 32, bellows 35 therebelow, and at its bottom a conical valve 36 adapted to coact with seat 14. Inside the bellows is a threaded boss 37 in which a stem 38 is screwed. This stem extends upwardly through the bellows and into the neck 18. The top end of the stem is threaded and a spring cap 39 is screwed thereon, compressing a compression spring 40 between it and the fitting 17.

The valve thus consists of a pressure responsive bellows type valve, and manually operable means for operating the bellows-type valve irrespective of the temperature, this means including the rod 27, the spring cap 39 and the stem 38.

The operation of the device is as follows:

When the thermostat (not shown) registers at a set temperature, the compressed air will pass through the air inlet nozzle 23, down through neck 18 and into bellows 35, causing the bellows to expand and close the valve 36 onto seat 14. This automatically shuts off the steam which comes through inlet nozzle 11 on its passage down to steam outlet nozzle 12.

When the room cools to 70 degrees (for example) the thermostat releases air which exhausts itself from bellows 35 through neck 18 and air inlet nozzle 23 to the thermostat. In this process bellows 35 contracts with the help of spring 40 which automatically opens valve 36 from seat 14 allowing steam to come through inlet nozzle 11 and so on out through outlet nozzle 12.

The course of steam may be reversed by having it travel from outlet nozzle 12 to inlet nozzle 11 instead of as previously described. It is important to note that this process makes it possible to be worked to within one degree of temperature. The valve 36 is interchangeable and is removably threaded onto the bottom of the bellows, a boss being provided on the bellows for mounting the valve 36.

When the bellows valve is working automatically, the neck 18 may be closed by an ordinary pipe cap screwed on top of the threads 19. However, should the bellows leak, it would be necessary to remove this cap and place the hand operated valve on the neck. It is considered better practice to have the hand operated valve on the neck in the first instance, and to render it inactive by opening the valve to full position.

Should the bellows break and steam enter it and pass upwardly through the neck, it would be stopped from leaking out of the valve by the cap 26 which is packed with packing 26a.

Thus the bellows can be operated by a manual control as well as by an automatic temperature control. The pressure needed can be regulated by regulating the tension of the spring 40 by means of the cap 39.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

1. In a steam valve having a hollow barrel formed at its bottom with a port surrounded by a valve seat and its top closed by a removable cap formed with a concentric opening, a fitment fixedly mounted in the opening of the cap and formed with a threaded recess extended in from its bottom end and a passageway extended from the top of said recess through the top of said fitment, an expandable bellows within said barrel, a threaded tubular nipple on the top end of said bellows and threaded into said recess connecting the top of said bellows to said fitment, a valve on the bottom of said bellows to be seated on the valve seat to close the port when said bellows is expanded, a tubular neck extended upward from said fitment concentric with said passageway, a boss within said bellows directly over said valve, a tubular casing closing the top end of said tubular neck, means for supplying air under pressure to the interior of said tubular neck, a stem having its bottom end passing slidably through said passageway, said nipple and into said bellows and connected to said boss and having its top end within said tubular neck, said stem having a diameter smaller than the diameter of said passageway and the interior of said nipple providing a clearance for the air under pressure to pass from said tubular neck into said bellows to expand said bellows and seat said valve on said valve seat, and resilient means within said tubular neck urging said stem upward when the air under pressure is released to collapse said bellows and hold said valve in a position unseated from said valve seat.

2. In a steam valve having a hollow barrel formed at its bottom with a port surrounded by a valve seat and its top closed by a removable cap formed with a concentric opening, a fitment fixedly mounted in the opening of the cap and formed with a threaded recess extended in from its bottom end and a passageway extended from the top of said recess through the top of said fitment, an expandable bellows within said barrel, a threaded tubular nipple on the top end of said bellows and threaded into said recess connecting the top of said bellows to said fitment, a valve on the bottom of said bellows to be seated on the valve seat to close the port when said bellows is expanded, a tubular neck extended upward from said fitment concentric with said passageway, a boss within said bellows directly over said valve, a tubular casing closing the top end of said tubular neck, means for supplying air under pressure to the interior of said tubular neck, a stem having its bottom end passing slidably through said passageway, said nipple and into said bellows and connected to said boss and having its top end within said tubular neck, said stem having a diameter smaller than the diameter of said passageway and the interior of said nipple providing a clearance for the air under pressure to pass from said tubular neck into said bellows to expand said bellows and seat said valve on said valve seat, and resilient means within said tubular neck urging said stem upward when the air under pressure is released to collapse said bellows and hold said valve in a position unseated from said valve seat, said resilient means comprising an enlarged cap mounted on the top end of said stem within said tubular neck, and an expansion spring coaxially mounted on said stem and operating between the bottom face of said cap and the top face of said fitment.

3. In a steam valve having a hollow barrel formed at its bottom with a port surrounded by a valve seat and its top closed by a removable cap formed with a concentric opening, a fitment fixedly mounted in the opening of the cap and formed with a threaded recess extended in from its bottom end and a passageway extended from the top of said recess through the top of said fitment, an expandable bellows within said barrel, a threaded tubular nipple on the top end of said bellows and threaded into said recess connecting the top of said bellows to said fitment, a valve on the bottom of said bellows to be seated on the valve seat to close the port when said bellows is expanded, a tubular neck extended upward from said fitment concentric with said passageway, a boss within said bellows directly over said valve, a tubular casing closing the top end of said tubular neck, means for supplying air under pressure to the interior of said tubular neck, a stem having its bottom end passing slidably through said passageway, said nipple and into said bellows and connected to said boss and having its top end within said tubular neck, said stem having a diameter smaller than the diameter of said passageway and the interior of said nipple providing a clearance for the air under pressure to pass from said tubular neck into said bellows to expand said bellows and seat said valve on said valve seat, and resilient means within said tubular neck urging said stem upward when the air under pressure is released to collapse said bellows and hold said valve in a position unseated from said valve seat, and manually operable means mounted on said tubular casing for urging said stem downward against the action of said resilient means to expand said bellows and engage the valve on the valve seat.

4. In a steam valve having a hollow barrel formed at its bottom with a port surrounded by a valve seat and its top closed by a removable cap formed with a concentric opening, a fitment fixedly mounted in the opening of the cap and formed with a threaded recess extended in from its bottom end and a passageway extended from the top of said recess through the top of said fitment, an expandable bellows within said barrel, a threaded tubular nipple on the top end of said bellows and threaded into said recess connecting the top of said bellows to said fitment, a valve on the bottom of said bellows to be seated on the valve seat to close the port when said bellows is expanded, a tubular neck extended upward from said fitment concentric with said passageway, a boss within said bellows directly over said valve, a tubular casing closing the top end of said tubular neck, means for supplying air under pressure to the interior of said tubular neck, a stem having its bottom end passing slidably through said passageway, said nipple and into said bellows and connected to said boss and having its top end within said tubular neck, said stem having a diameter smaller than the diameter of said passageway and the interior of said nipple providing a clearance for the air under pressure to pass from said tubular neck into said bellows to expand said bellows and seat said valve on said valve seat, and resilient means within said tubular neck urging said stem upward when the air under pressure is released to collapse said bellows and hold said valve in a position unseated from said valve seat, and manually operable means mounted on said tubular casing for urging said stem downward against the action of said resilient means to expand said bellows and engage the valve on the valve seat, said tubular casing having a threaded opening through the top thereof, said manually operable means comprising a rod engaged threadedly through said tubular casing in axial alignment with said stem to be turned downward to have its bottom end engage said stem and press the same downward against the action of said resilient means.

JOHN P. CONLAN.

REFERENCES CITED

The following references are of record in the file of this patent:

UNITED STATES PATENTS

| Number | Name | Date |
|--------|------|------|
| 269,886 | Semple | Jan. 2, 1883 |
| 314,027 | Johnson | Mar. 17, 1885 |
| 652,859 | Newman | July 3, 1900 |
| 1,439,750 | Nelson | Dec. 26, 1922 |
| 1,458,228 | Hagen | June 12, 1923 |
| 1,752,534 | McKee | Apr. 1, 1930 |